(12) United States Patent
Okada et al.

(10) Patent No.: US 7,254,368 B1
(45) Date of Patent: Aug. 7, 2007

(54) AUDIO SYSTEM AND HEAD ATTACHMENT AUDIO UNIT

(75) Inventors: Teruo Okada, Fujioka (JP); Hideaki Nebashi, Hadano (JP); Shuichi Inage, Kumagaya (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 488 days.

(21) Appl. No.: 09/579,137

(22) Filed: May 30, 2000

(30) Foreign Application Priority Data

May 31, 1999 (JP) .............................. P11-152952

(51) Int. Cl.
*H04B 7/00* (2006.01)

(52) U.S. Cl. ................. 455/41.3; 455/41.2; 455/556.1; 455/575.2; 381/384

(58) Field of Classification Search ........... 340/825.72, 340/825.71, 3.5, 825.69, 825.25, 825.22, 340/825.24; 345/169; 455/39, 41, 66, 151.1, 455/92, 88, 352, 353, 354, 355, 66.1, 41.2, 455/41.3, 344; 381/311, 74, 315, 384
See application file for complete search history.

(56) References Cited

U.S. PATENT DOCUMENTS

| | | | | |
|---|---|---|---|---|
| 5,138,649 A | * | 8/1992 | Krisbergh et al. | ........... 455/420 |
| 5,197,332 A | * | 3/1993 | Shennib | ........ 73/585 |
| 5,316,249 A | * | 5/1994 | Anderson | .................. 248/146 |
| 5,378,874 A | * | 1/1995 | Holling et al. | ............... 219/506 |
| 5,461,812 A | * | 10/1995 | Bennett | ..................... 42/70.11 |
| 5,499,713 A | * | 3/1996 | Huffer | ....................... 206/320 |
| 5,587,704 A | * | 12/1996 | Foster | ..................... 340/573.1 |
| 5,640,458 A | | 6/1997 | Nishiguchi et al. | |
| D395,355 S | * | 6/1998 | von Freiberg | ................ D3/203 |
| 5,847,305 A | * | 12/1998 | Yoshikawa et al. | ........... 84/634 |
| 5,896,691 A | * | 4/1999 | Kaminski et al. | .......... 42/70.11 |
| 5,905,947 A | * | 5/1999 | Stein | ......................... 455/90.3 |
| 6,124,804 A | * | 9/2000 | Kitao et al. | ............ 340/825.69 |
| 6,213,619 B1 | * | 4/2001 | Yu | ............................. 362/103 |
| 6,233,002 B1 | * | 5/2001 | Shibayama | .............. 348/14.05 |

(Continued)

FOREIGN PATENT DOCUMENTS

CN           1215970           5/1999

(Continued)

OTHER PUBLICATIONS

Operating Instructions for a Sony CDP-X77ES Compact Disc Player, 1990.*

*Primary Examiner*—Lewis West
(74) *Attorney, Agent, or Firm*—Oblon, Spivak, McClelland, Maier & Neustadt, P.C.

(57) ABSTRACT

An audio system is provided that comprises a headphone for reading music information or the like recorded in a memory card attached to an external interface to reproduce audio signal and for outputting sound conforming to the audio signal; and a remote control unit for transmitting control signal for controlling reproduction function or the like of the music information of the headphone to the headphone due to infrared rays. In the audio system, the control signal of infrared rays of less data amount compared with the audio signal or the like is transmitted. Accordingly, circuit configuration and component configuration can be made simpler, the remote control unit can be downsized, and the headphone and the remote control unit can be made wireless, resulting in an easier handling.

22 Claims, 12 Drawing Sheets

U.S. PATENT DOCUMENTS

| | | | |
|---|---|---|---|
| 6,307,945 B1 * | 10/2001 | Hall | 381/315 |
| 6,437,836 B1 * | 8/2002 | Huang et al. | 348/734 |
| 6,466,677 B1 * | 10/2002 | Bush | 381/300 |
| 6,606,506 B1 * | 8/2003 | Jones | 455/566 |
| 6,732,381 B1 * | 5/2004 | Lal | 2/425 |

FOREIGN PATENT DOCUMENTS

| | | |
|---|---|---|
| GB | 1 413 424 A | 11/1975 |
| GB | 2316788 A * | 3/1998 |
| GB | 2 239 737 A | 3/1999 |
| JP | 01-175492 | 7/1989 |
| JP | 03-139700 | 6/1991 |
| JP | 56-98996 | 8/1991 |
| JP | 6-251080 | 9/1994 |
| JP | 8-9483 | 1/1996 |
| JP | 08-172679 | 7/1996 |
| JP | 11-98590 | 4/1999 |

* cited by examiner

AUDIO SYSTEM AND HEAD ATTACHMENT AUDIO UNIT

BACKGROUND OF THE INVENTION

1. Technical Field

The present invention relates to an audio system for reproducing information recorded on a medium such as music or the like, in particular relates to an audio system suitable for portable purpose.

2. Description of the Related Art

This application claims benefit of priority under 35USC§119 to Japanese Patent Application No. HEI 11-152952, filed on May 31, 1999 the entire contents of which are incorporated by reference herein.

In general, a portable audio system, as shown in FIGS. 1 and 2, with a small reproducing unit 103 or 104 mountable a memory medium such as a memory card 101 or a cassette tape 102, reads for instance music information recorded on a mounted memory medium. The read music information is transmitted from the reproducing unit 103 or 104 through a connecting cord 105 to a headphone 106. Thereby, with the headphone 106, music can be heard.

Recently, as disclosed in Japanese Patent Application No. HEI 5-39167 (Japanese Patent Laid-open Application (KO-KAI) No. HEI 6-251080), there is a wireless audio system. That is, the wireless audio system reads music information or the like of a memory card mounted on a reproduction unit to generate audio signal. The audio signal is FM transmitted from the reproduction unit side to a headphone side.

Further, an audio system disclosed in Japanese Patent Application No. HEI 6-139244 (Japanese Patent Laid-open Application (KOKAI) No. HEI 8-9483) can download audio data to a memory module such as a memory card or the like disposed to a headphone. The respective operation buttons including a play button of audio data or a volume control button or the like are disposed to the headphone itself. Thus, an audio system is constituted of the headphone alone.

However, the aforementioned audio system has the following problems. That is, the audio system disclosed in Japanese Patent Application No. HEI 5-39167 transmits FM audio signal. Accordingly, a transmitter/receiver circuit becomes complicated which necessarily results in higher costs. Further, FM-transmission of the audio signal necessarily invites a deterioration of sound quality and, if there is a user using a similar audio system in the neighborhood, there may be problems with radio interference.

Further, since the audio system disclosed in Japanese Patent Application No. HEI 6-139244 is constituted of a single headphone, each operation button is also mounted on the headphone itself. Accordingly, in the audio system, a user, when hearing sound, namely when wearing a headphone on his or her head, can not see various kinds of operation buttons. As a result, there is a problem of a difficulty in executing various kinds of operations for instance such as volume control, play stop or the like. In addition, in the audio system of this type, being short of display function or the like, there is no way to easily check memory remains of the memory card or the like and a file number showing an order of music or the like. Accordingly, there is also a problem of convenience.

SUMMARY OF THE INVENTION

The present invention is carried out to overcome these problems. The object of the present invention is to provide an audio system that, with a simple configuration, can reproduce sound information or the like with high sound quality and reliability, and is high in convenience and excellent in operability.

In order to attain the aforementioned object, an audio system of the present invention comprises a head attachment audio unit and a remote control unit. The head attachment audio unit has a reproduction portion for reproducing sound information stored in a memory portion and an output portion for outputting sound according to the reproduced sound information. The remote control unit transmits control signal that controls the reproduction portion of the head attachment audio unit.

In the present audio system, the head attachment audio unit, for instance a headphone, has a function of reproducing sound information stored in a memory portion and of outputting sound corresponding to the sound information. Further, the remote control unit transmits control signal for controlling a reproduction function of the head attachment audio unit. That is, according to the audio system of the present invention, the signal transmitted from the remote control unit is not an audio signal or the like but the control signal that controls the audio signal at the head attachment audio unit side. Accordingly, the sound quality of for instance music to be outputted does not deteriorate in a transmission line between the remote control unit and the head attachment audio unit to result in outputting sound of high quality from the head attachment audio unit.

DESCRIPTION OF PREFERRED EMBODIMENTS

In the following, modes of implementation of the present invention will be explained with reference to drawings.

Figure 1:
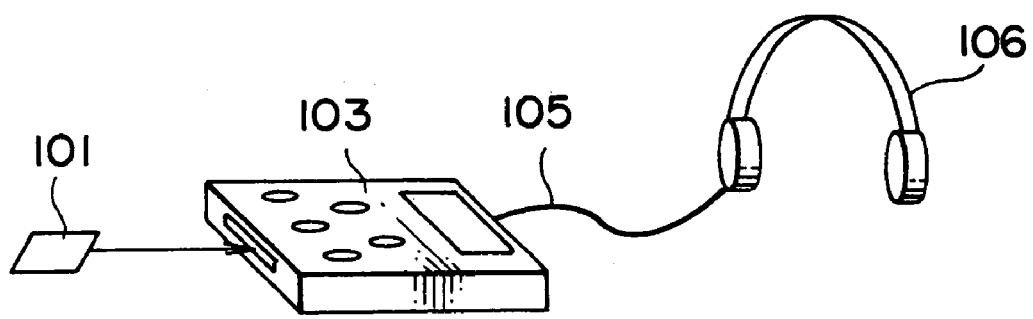
FIG. 1 is a diagram schematically showing an existing audio system.
Figure 2:
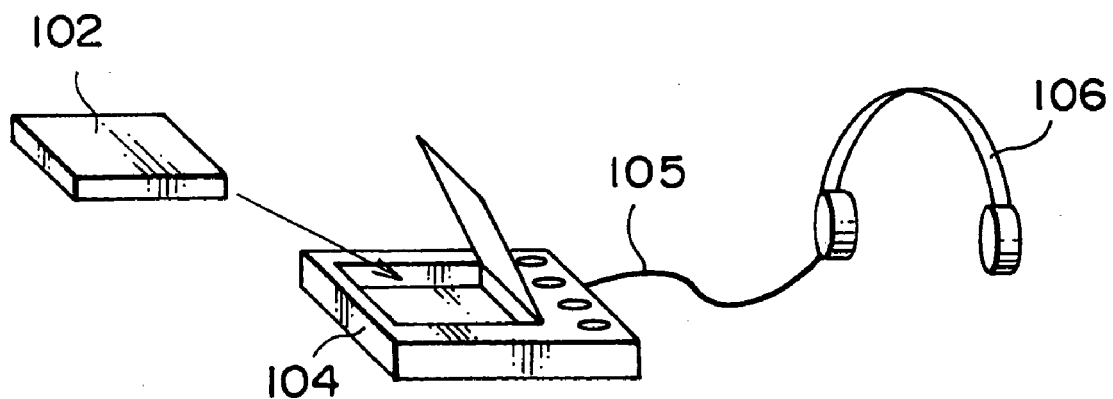
FIG. 2 is a diagram schematically showing another existing audio system different from the audio system of FIG. 1.
Figure 3:
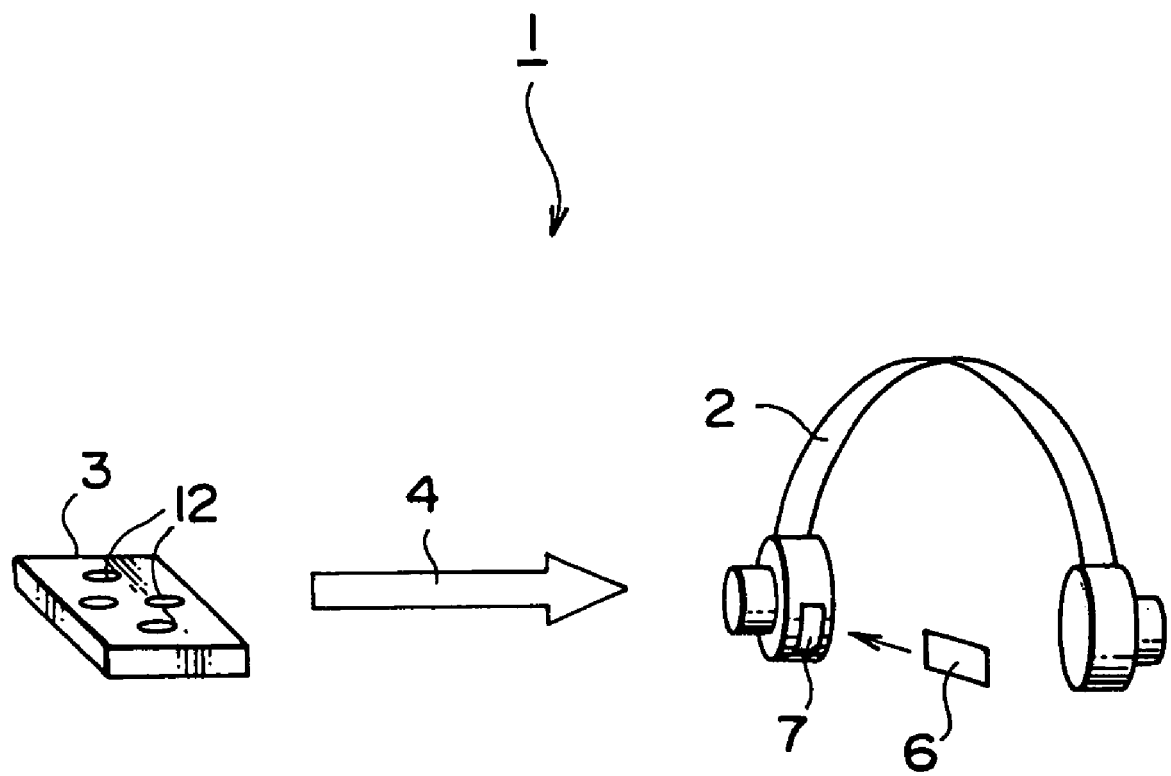
FIG. 3 is a diagram schematically showing an audio system involving a first embodiment of the present invention.
Figure 4:
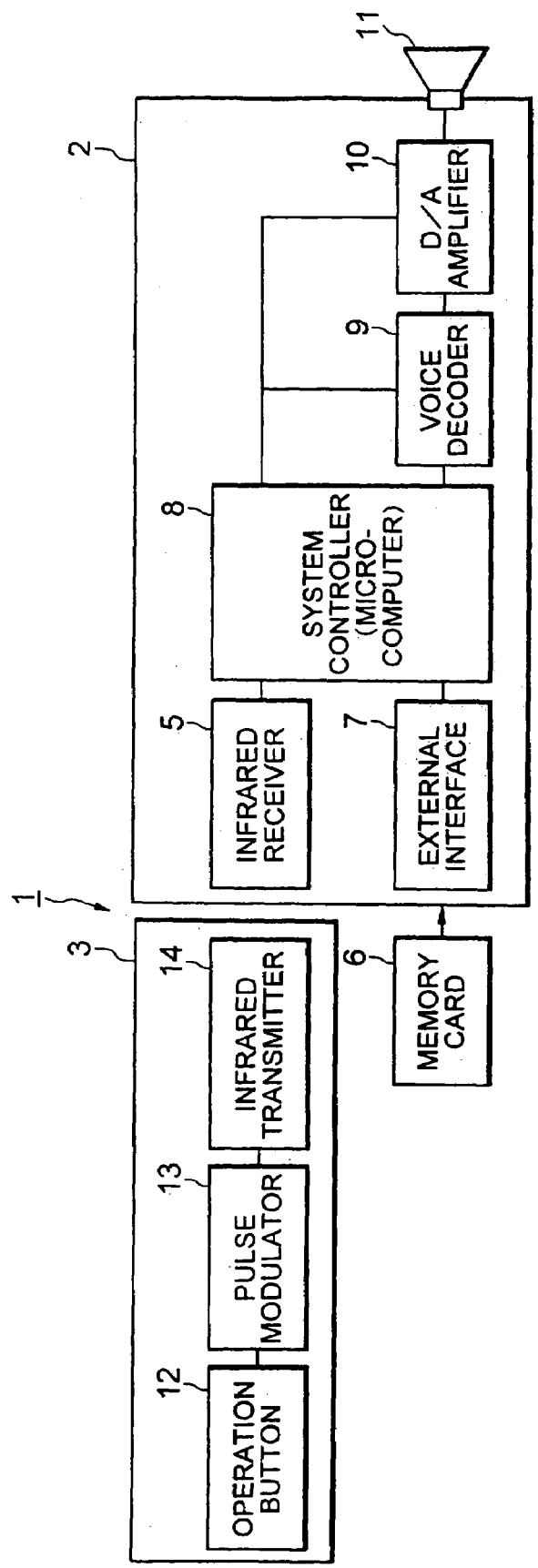
FIG. 4 is a block diagram showing the audio system of FIG. 3.

FIG. 3 is a diagram schematically showing an audio system involving a first embodiment of the present invention, FIG. 4 being a block diagram thereof.

As shown in these figures, the audio system 1 is constituted of for instance a headphone 2 that is a head attachment audio unit mounted on user's head and a remote control unit 3 for remote controlling the headphone 2.

To the headphone 2, an infrared rays receiver 5, an external interface 7, a system controller 8, a voice decoder 9, a D/A converter/amplifier 10, and a headphone speaker 11 are disposed. The infrared rays receiver 5 receives infrared control signal 4 transmitted when the remote control unit 3 is operated. To the external interface 7, a memory card 6 such as smart media or the like thereon for instance music information is codified as a compressed file to record is mounted. The system controller 8 integrally controls each portion of the headphone 2. The voice decoder 9 decodes the music information or the like coded and recorded in the memory card 6 as audio signal. The D/A converter/amplifier 10 converts the decoded music information from digital signal to analog signal to amplify. The headphone speaker 11 outputs the audio signal that is converted to the analog signal to amplify as sound.

The remote control unit 3 is constituted of a plurality of operation buttons 12, a pulse modulator 13, and an infrared rays transmitter 14. The plurality of operation buttons 12 controls a reproduction function or the like of the music information recorded in the memory card 6 mounted on the headphone 2. The pulse modulator 13 pulse modulates due to for instance PPM (Pulse Position Modulation) method the signal generated according to a pushed button 12 when a certain operation button 12 is pushed down. Then infrared rays transmitter 14 transmits the control signal 4 modulated due to the pulse modulator 13 and controlling the headphone 2 to the headphone 2 due to the infrared rays.

Figure 5:
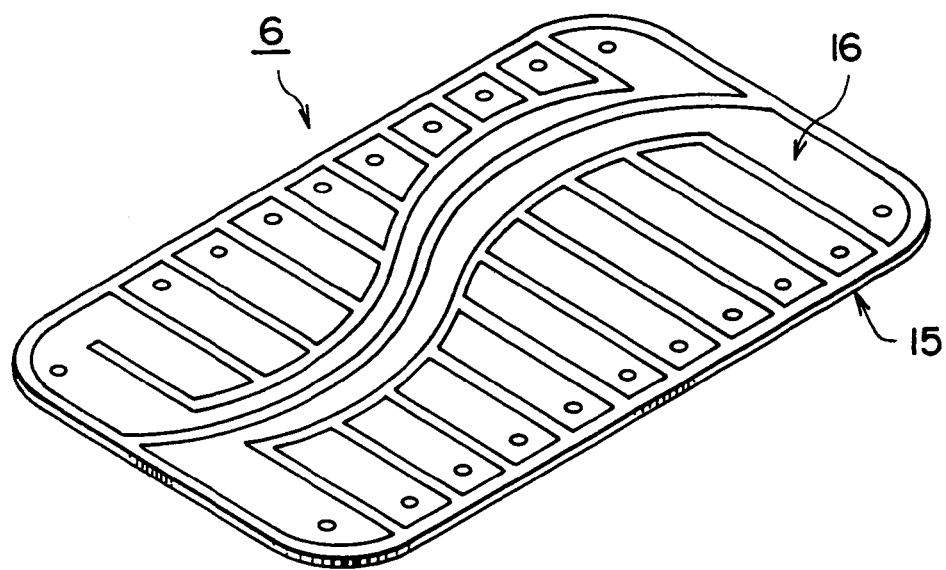
FIG. 5 is a perspective view showing a memory card mounted on a headphone of the audio system of FIG. 3.

The memory card 6 capable of freely attachable to and detachable from the headphone 2, as shown in FIG. 5, is constituted of a printed wiring board 15, a planar external connection terminal 16, a semiconductor element (not shown in the figure). The planar external connection terminal 16 is disposed on one surface of the printed wiring board 15. The semiconductor element is mounted on the other surface of the printed wiring board 15 and connected to the planar external connection terminal 16 and the like. The semiconductor element that the memory card 6 has is a NAND type EEPROM that is a serial access-type memory element sequentially inputting/outputting all of read data or write data and commands to and from a common I/O pin. The memory card 6 is constituted by bonding the connection terminals of such semiconductor element and printed wiring board 15 to connect, further by connecting due to interlayer connection the connection terminals of the printed wiring board 15 and the planar external connection terminal 16 through via-holes.

Next, a case where due to an audio system 1 constituted like this the music information recorded in a memory card 6 is actually outputted as sound will be explained.

When a user, through an operation button 12 of a remote control unit 3, demands reproduction of music information recorded in a memory card 6 mounted on a headphone 2, signal is generated according to the content of the operation button 12. The generated signal is pulse-modulated by a pulse-modulator 13 due to PPM method or the like, infrared control signal being transmitted from an infrared transmitter 14. When the control signal 4 is received by an infrared receiver 5 of the headphone 2, a system controller 8 notices reproduction demand of the music information recorded in the memory card 6 as a compressed file. Thereafter, the system controller 8 reads the music information coded and recorded in the memory card 6 and further a voice decoder 9 decodes as audio signal. The decoded audio signal is converted into analog signal and amplified through a D/A converter/amplifier 10 and outputted as sound from a headphone speaker 11.

Thus, according to the audio system of the present invention, the headphone 2 have a function of reproducing the music information stored in the memory card 6 mounted on the headphone 2 body and of outputting sound corresponding the music information. The remote control unit 3 transmits the control signal for controlling the reproduction function of the headphone 2. That is, according to the audio system 1 of the present embodiment, the signal transmitted from the remote control unit 3 is not audio signal or the like but is the control signal 4 for controlling the audio signal at the headphone 2 side. Accordingly, without deteriorating the quality of the sound outputted from the headphone 2 in a transmission path between the remote control unit 3 and the headphone 2, the sound of high quality can be outputted from the headphone 2.

Further, according to the present audio system 1, the signal transmitted from the remote control unit 3 is the infrared control signal obviously less of data amount compared with the audio signal transmitted over FM waves or the like. Accordingly, circuit configuration and component configuration as a system can be made simpler to result in a constitution of inexpensive audio system. Still further, due to easiness of coding of the control signal of less data amount as well as the transmission of the control signal due to the infrared rays of high directionality, different from the transmission due to the FM waves, the radio interference or the like can be prevented from occurring. Further, in the audio system 1 of the present embodiment, being constituted with a simple circuit configuration and component configuration as mentioned above, the remote control unit 3 can be not only formed in a smaller size but also freely formed in a shape easy to carry. In addition, the headphone 2 and the remote control unit 3, being wireless, become easy to handle, respectively.

Figure 6:
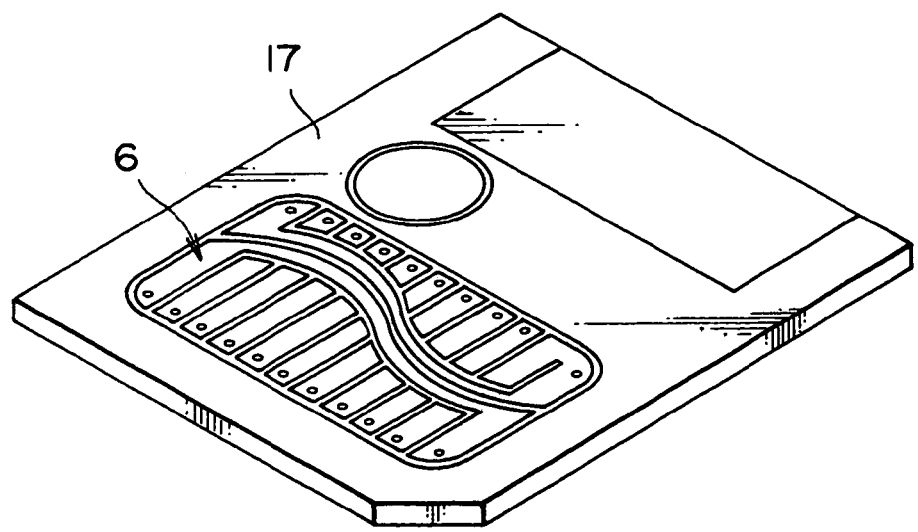
FIG. 6 is a perspective view showing a support card that holds attachable and detachable the memory card of FIG. 5.

Further, in the audio system 1 of the present embodiment, a medium storing the music information is a memory card of extremely small size and capable of freely attachable and detachable to and from the headphone 2. Accordingly, the desired sound information can be freely edited by use of for instance a personal computer or the like. In addition to this, the headphone 2 can be constituted in a compact size. The memory card 6, when treated by a personal computer, as shown in FIG. 6, can be treated by use of a support card 17 or the like. That is, the support card 17 holds for the memory card 6 to expose the planar external connection terminal thereof and to be capable of freely attaching and detaching. A not shown concave portion is disposed so that a contour of the memory card 6 conforms thereto.

As mentioned above, in the audio system 1 of the present embodiment, the memory medium recording the music information or the like is the memory card 6 capable of freely attachable to and detachable from the headphone 2. However, the memory medium can be a solid memory directly disposed on the headphone 2 body.

Thus, according to the above embodiment, the remote control unit can transmit the control signal over the radio.

Thereby, the present audio system can be constituted so that due for instance to infrared rays or the like that can simplify the circuit and component configuration the control signal is transmitted. Thereby, the audio system can be constituted less expensive and the control signal can be easily codified to result in suppression of an occurrence of radio interference different from the transmission due to FM electromagnetic waves. In addition, since the present audio system can be constituted in the simpler circuit and component configuration, not only a smaller remote control unit can be realized but also the remote control unit can be formed in a shape easy to carry such as a wristwatch type or a brooch type. Further, in the present audio system, the head attachment audio unit and the remote control unit being wireless, each individual unit can be easily handled.

Still further, according to the present embodiment, the memory portion can be a memory medium capable of freely attaching to and detaching from the head attachment audio unit.

That is, in the present audio system, the memory portion can be the memory medium capable of freely attaching to and detaching from the head attachment audio unit. Accordingly, by employing for instance a memory card or the like as the memory medium, with a personal computer or the like desired sound information can be freely edited and the head attachment audio unit can be constituted in a compact size.

Further, in the present audio system, the memory portion can be a solid memory disposed on the head attachment audio unit body.

The present audio system can provide the head attachment audio unit with a solid memory as a memory portion therein sound information is stored. Accordingly, in the solid memory, desired sound information can be recorded in advance.

Further, in the present audio system, the head attachment audio unit comprises an input terminal for inputting audio signal from the exterior.

The present audio system can be provided with an input terminal such as a jack for inputting audio signal. Accordingly, by connecting the head attachment audio unit to an external reproduction unit having a reproduction function of the sound information through the input terminal, the head attachment audio unit can be used as a general use headphone.

Further, in the present audio system, the head attachment audio unit may comprise a response portion for returning response signal corresponding to the control signal to the remote control unit, the remote control unit being able to comprise further a reception portion for receiving the response signal.

The present audio system can notify the response signal from the head attachment audio unit corresponding to the control signal transmitted from the remote control unit to the remote control unit. Accordingly, a user who operated the remote control unit can confirm whether or not the control based on the operation content is implemented at the head attachment audio unit side.

Further, in the present audio system, the remote control unit may further comprise a display portion for visually displaying the information based on the response signal received at the reception portion.

In the present audio system, a user who operated the remote control unit can grasp whether the control according to a content of operation is implemented at the head attachment audio unit side or not due to the information based on the response signal visually displayed. Accordingly, mishandling of the remote control unit or the like can be prevented from occurring. In addition, the memory remains of the memory portion of the head attachment audio unit therein sound information is recorded or battery remains for driving the head attachment audio unit can be obtained at the remote control unit side.

Further, in the present audio system, the remote control unit may further comprise a plurality of control buttons, a transmitter/receiver, and a display portion. The plurality of control buttons carries out the control involving the reproduction of the sound information. The transmitter/receiver transmits the control signal corresponding to a pushed down control button when any one of the control button is pushed down and receives the response signal corresponding to the control signal. The display portion visually displays the information based on the response signal received by the transmitter/receiver.

The present audio system, when an arbitrary control button of the remote control unit is pushed down and the control signal corresponding to the control involving the reproduction of the pushed down control button is transmitted, can visually display the information based on the response signal from the head attachment audio unit on the display portion disposed at the remote control unit. Accordingly, a user who operates the remote control unit can grasp a mode of control involving the reproduction of the sound information at the head attachment audio unit side such as for instance play, reverse, fast forward or stop. As a result, whether an intended control is assuredly implemented at the head attachment audio unit side or not can be confirmed.

Further, in the present audio system, the transmitter/receiver that the remote control unit possesses may be disposed on the same face with that where the display portion or the control buttons are disposed.

According to the present audio system, when a user puts the head attachment audio unit on user's head and operates the remote control unit observing the display portion or the control buttons of the remote control unit, the transmitter/receiver is necessarily directed to the head attachment audio unit side that is put on the user's head. Accordingly, the user, without noticing a direction of the remote control unit, can assuredly implement transmission and reception of the control signal or the response signal to the control signal.

Further, in the present audio system, the remote control unit may further comprise an ON/OFF control portion for controlling ON/OFF of a main power source of the remote control unit body according to a situation of input from the control button.

According to the present audio system, ON/OFF control of the main power source of the remote control unit body is carried out according to a situation of input from the control button. For instance, when the control button is not pushed down for more than a prescribed period of time, the main power source of the remote control unit body is controlled to be OFF state. After the main power source becomes OFF, when the control button is pushed down, the main power source of the remote control unit body is controlled to be ON. Thereby, without damaging convenience as the system, power saving that is an important item for a portable electrical appliance can be realized.

In the present audio system, the remote control unit comprises a transmitter for transmitting the control signal, and the transmitter may comprise an antenna for transmitting electromagnetic waves and a shield unit therein the antenna is inserted and having an opening at a prescribed position.

According to the audio system of the embodiment, even when the control signal is transmitted over electromagnetic waves, since the waves can be sent out of the opening, omnidirectional electromagnetic waves can be sent out only in a particular direction. Accordingly, the radio interference of the control signal can be prevented from occurring and other's head attachment audio unit is prevented from being wrongly operated in spite of the control of one's head attachment audio unit.

Further, audio signal or the like can be sent out of a memory portion disposed on the head attachment audio unit, being not necessary to be sent out of the remote control unit. Accordingly, even in the case of directionality being given in sending out the electromagnetic waves, during reproduction of the sound information such as during hearing music, the remote control unit is not required to incessantly direct toward the head attachment audio unit. Only when the head attachment audio unit is controlled, the remote control unit is necessary to be directed toward the head attachment audio unit. The user's load during handling the remote control unit can be alleviated accordingly.

In the audio system of the present embodiment, the remote control unit may comprise a mechanism for attaching and detaching the remote control unit to and from a band of a wristwatch.

According to the audio system of the embodiment, without wearing a band dedicated to a remote control unit on an arm, the remote control unit can be wore on an arm to carry. Accordingly, a convenience during carrying the remote control unit can be improved.

Further, in the audio system of the present embodiment, the remote control unit can be a ring type.

According to the present audio system, the remote control unit, being able to fit on a finger, can be improved in the convenience thereof during carrying the remote control unit, and the remote control unit can be used as a kind of fashion.

Further, in the audio system of the present embodiment, the remote control unit can be attached with an adhesive tape.

According to the audio system of the present embodiment, the remote control unit, being able to easily fit to various places, can be improved in the convenience thereof during carrying the remote control unit.

Further, in the audio system of the present embodiment, the remote control unit can be a wristwatch type.

According to the present audio system, a remote control unit can be put on an arm. Accordingly, an inconvenience of carrying the remote control unit in a bag or a briefcase and of taking out the remote control unit of a bag or a briefcase can be avoided to result in an improvement of the convenience during carrying the remote control unit.

Further, in the audio system of the present embodiment, the remote control unit can be a pendant type.

According to the audio system of the present embodiment, the remote control unit, being able to carry by hanging from a neck, can eliminate trouble of bringing the remote control unit in a bag or a briefcase. Accordingly, the convenience during bringing the remote control unit can be improved.

Further, in the audio system of the present embodiment, the remote control unit can be one body with a portable information terminal.

According to the audio system of the present embodiment, for instance, from a portable telephone and PHS, the head attachment audio unit can be controlled. Thereby, it is made unnecessary to separately bring a remote control unit dedicated to the head attachment audio unit. Accordingly, load in carrying the remote control unit can be eliminated.

Further, in the audio system of the present embodiment, the sound information may be downloaded through a portable information terminal to the memory portion.

According to the audio system of the present embodiment, for instance, from the portable telephone and the PHS, favorite music information can be stored in the memory portion at a desired time. Thereby, when desired, desired music can be arbitrarily selected to hear.

Further, in the audio system of the present embodiment, the head attachment audio unit may comprise a mechanism for attaching and detaching the remote control unit.

According to the audio system of the present embodiment, during the remote control unit being unused, the remote control unit and the head attachment audio unit can be integrally handled. Accordingly, the remote control unit is prevented from being left behind and from being lost.

Figure 7:
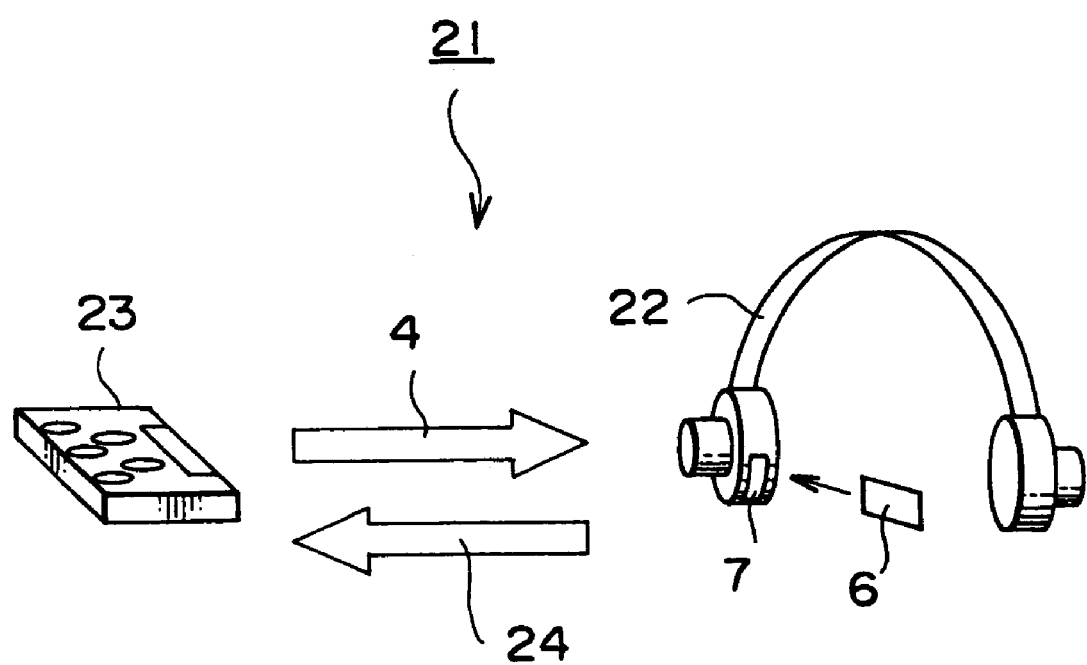
FIG. 7 is a diagram schematically showing an audio system involving a second embodiment of the present invention.
Figure 8:
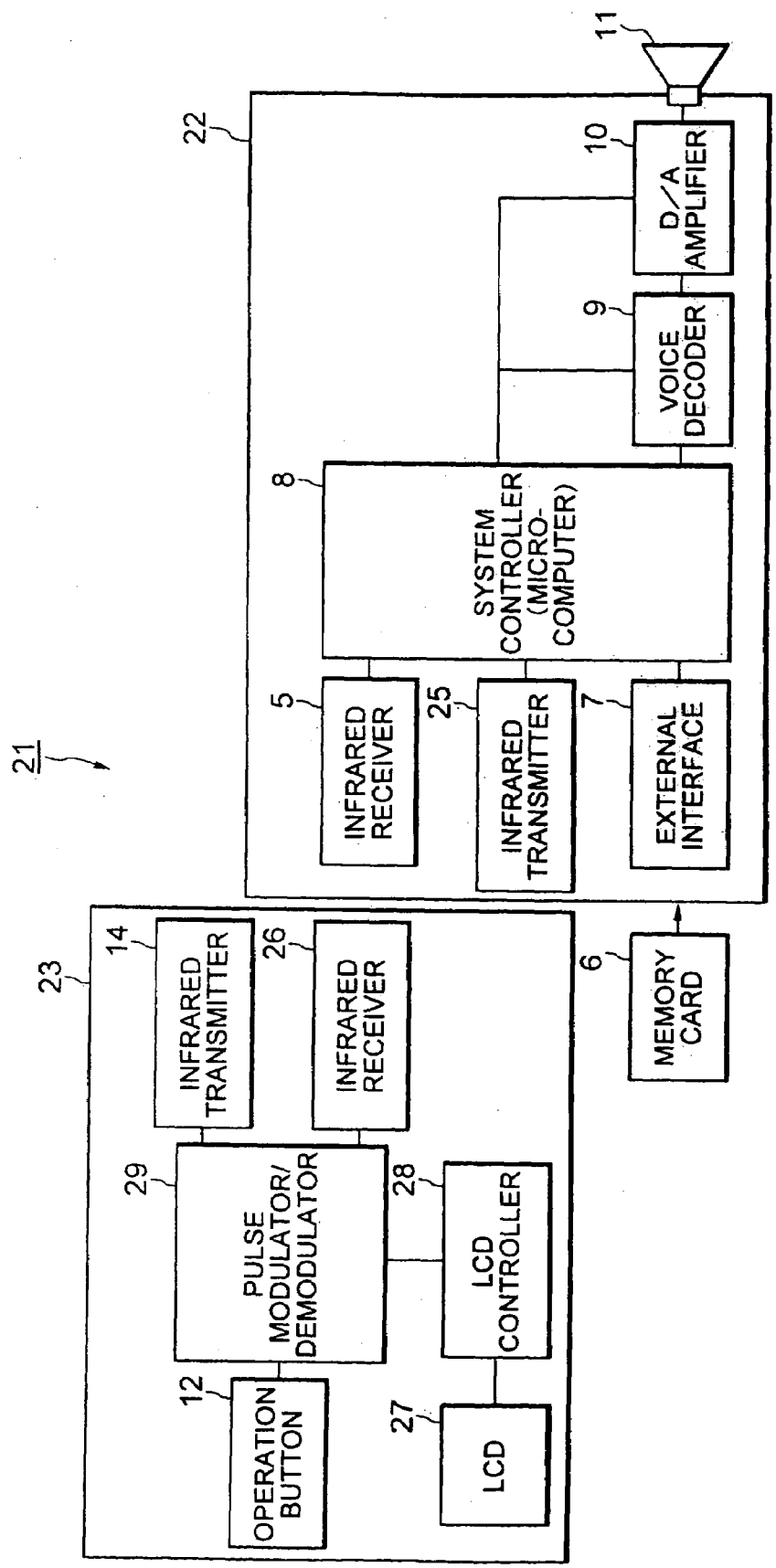
FIG. 8 is a block diagram showing the audio system of FIG. 7.

In the following, a second embodiment of the present invention will be explained with reference to the drawings. As shown in FIGS. 7 and 8, in an audio system 21 of the present embodiment, to both of a headphone 22 and a remote control unit 23, a transmission function and reception function are disposed. That is, in the headphone 22 of the embodiment, in addition to the headphone 2 of the first embodiment, an infrared transmitter 25 for returning response signal 24 corresponding to control signal 4 received by an infrared receiver 5 to a remote control unit 23 is disposed.

Further, in the remote control unit 23 of the present embodiment, in addition to the constitution of the remote control unit 3 of the first embodiment, an infrared receiver 26 for receiving response signal 24 returned from the headphone 22, a liquid crystal display panel (LCD) 27 for visually displaying the information based on the response signal 24, and a LCD controller 28 for controlling the liquid crystal panel 27 are disposed. In addition, in the remote control unit 23, instead of the pulse modulator 13 of the remote control unit 3 of the first embodiment, a pulse modulator/demodulator 29 that pulse modulates the signal generated when the operation button 12 is pushed down and demodulates the response signal 24 received by the infrared receiver 26 into electrical signal is disposed.

According to thus constituted audio system 21 of the present invention, the response signal 24 from the headphone 22 corresponding to the control signal 4 transmitted from the remote control unit 23 can be notified to the remote control unit 23. Thereby, a user who operated the remote control unit 23 can confirm whether the control based on the content of operation is implemented on the headphone 22 side or not due to the information based on the response signal 24 displayed on the liquid crystal display panel 27. Accordingly, incorrect operation of the remote control unit 23 can be prevented from occurring. Further, according to the audio system 21 of the present embodiment, memory remains of the memory card 6 of the headphone 22 thereon music information is recorded or battery remains of the headphone 22 can be obtained at the remote control unit 23 side.

Further, to the headphone 22 of the present embodiment, a headphone jack may be disposed so that audio signal can be directly inputted from the external to a D/A converter/amplifier 10. Due to disposition of such a headphone jack, an external reproduction unit capable of reproducing the music information can be connected with the headphone 22. Accordingly, the headphone 22 of the present embodiment can be used as an ordinary headphone.

Figure 9:
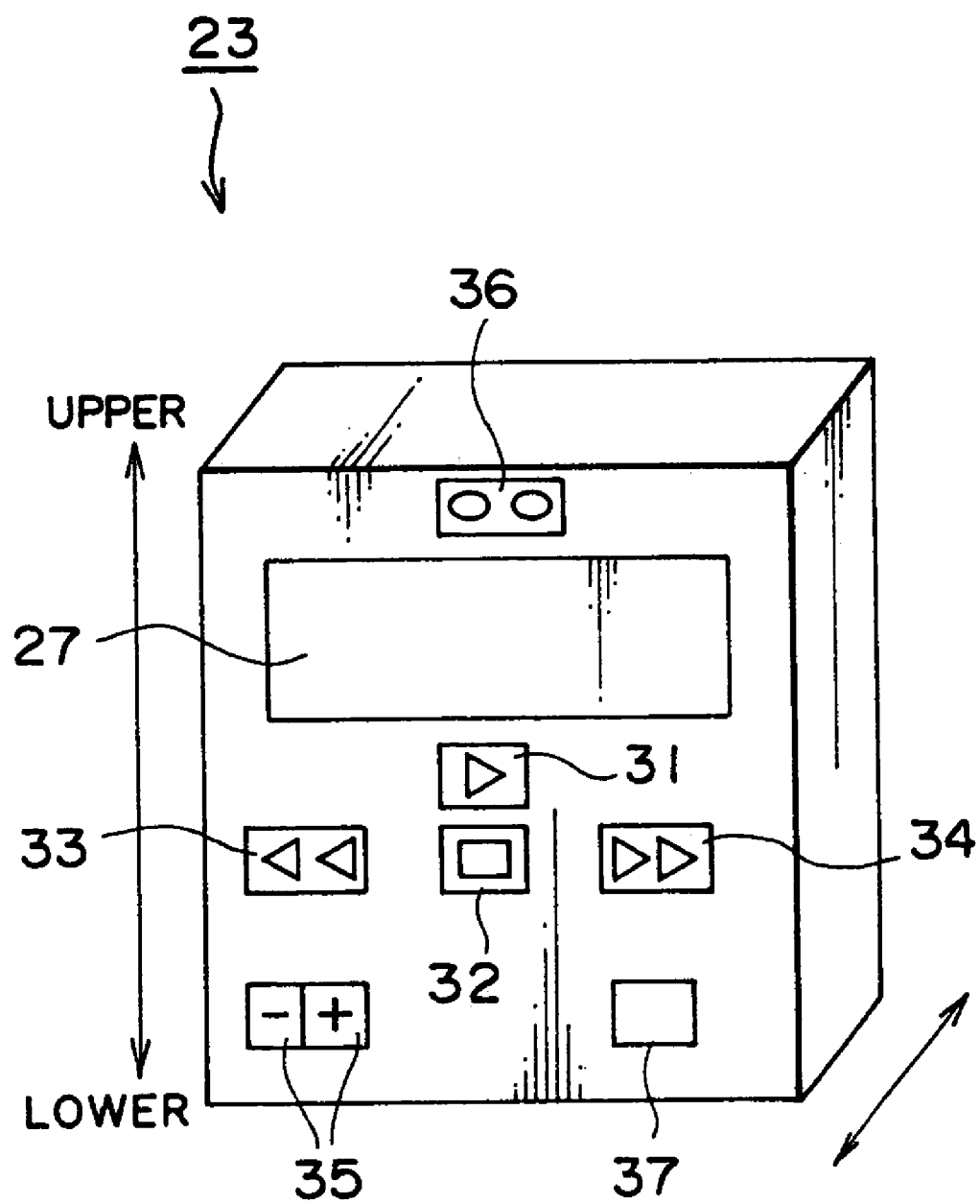
FIG. 9 is a perspective view showing a remote control unit involving a third embodiment of the present invention.

Next, a third embodiment of the present invention will be explained. In the present embodiment, the remote control unit 23 of the second embodiment will be explained in detail. That is, the remote control unit 23, as shown in FIG. 9, is constituted of a play button 31, a stop button 32, a reverse button 33, a fast forward button 34, a volume control button 35, an infrared transmitter/receiver 36, a liquid crystal display panel 27, and a data display button 37. The play button 31 effects to play music information recorded in the memory card 6. The stop button 32 stops the play of the music information. The reverse button 33 rewinds a song to be played to a song of younger file No. The fast forward button 34 fast forwards a song to be played to a song of older file No. The volume control button 35 controls the volume of the sound outputted from the headphone 22. The infrared transmitter/receiver 36 transmits the control signal 4 that controls an operation state of the headphone 22 and receives the response signal 24 returned from the headphone 22. The liquid crystal display panel 27 displays the information based on the response signal 24. The data display button 37 demands to display data at the headphone 22 side without influencing on a state of operation at the headphone 22 side.

Figure 10:
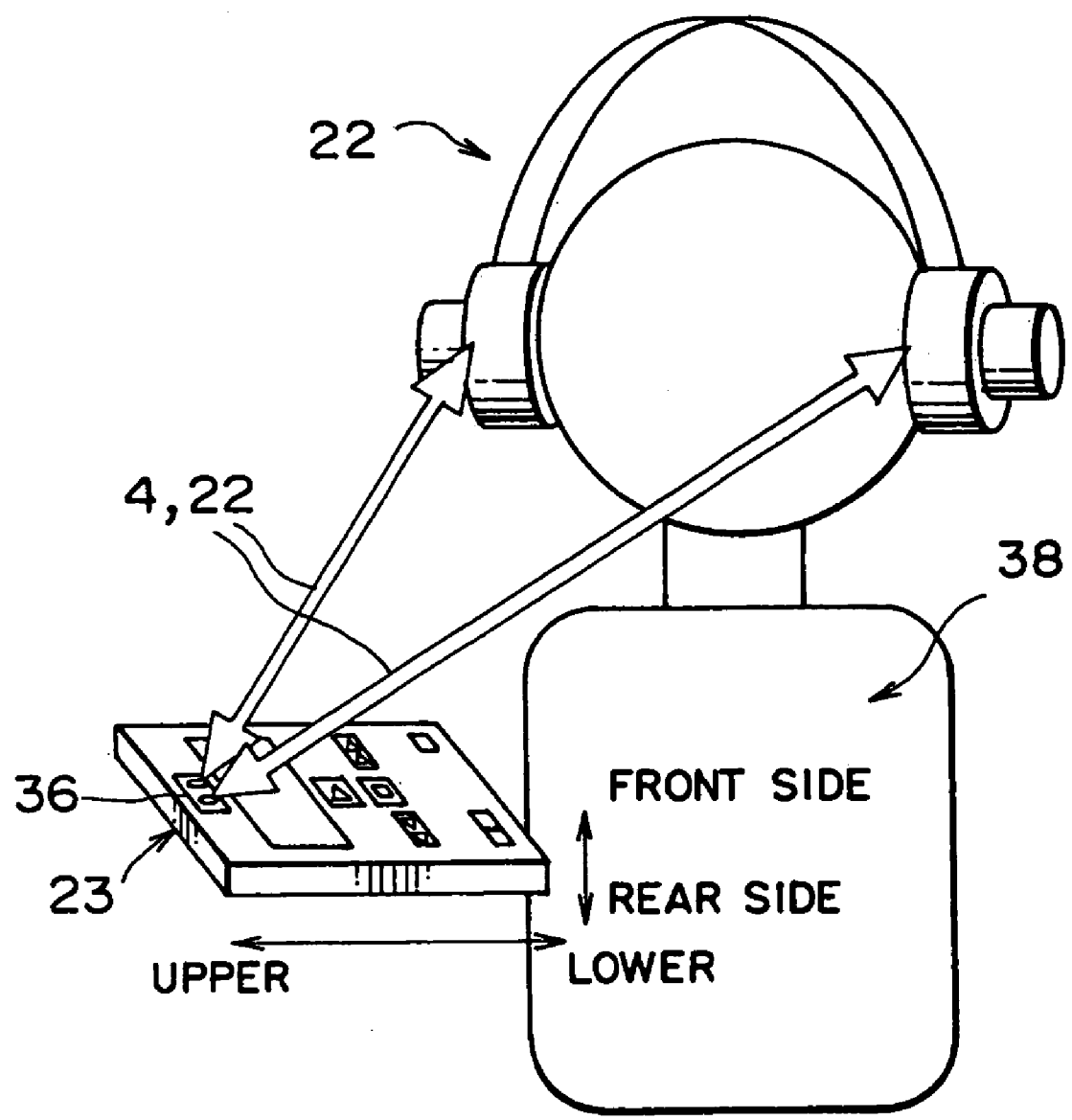
FIG. 10 is a diagram for explaining a situation of transmission and reception of signal when the remote control unit of FIG. 9 is operated.

The infrared transmitter/receiver 36 is disposed on a face of the remote control unit 23, that is, on the same face with that where the liquid crystal display panel 27, the play button 31 and the stop button 32 are disposed. That is, as shown in FIG. 10, a user 38, in operating the remote control unit 23, operates it at a lower side of a front direction of the face of the user 38 where the liquid crystal display panel 27 of the remote control unit 23 can be most easily seen or the play button 31 and the stop button 32 can be easily operated. Accordingly, the infrared transmitter/receiver 36 of the remote control unit 23 and the headphone 22 necessarily face to each other to result in a state of good communication of the control signal 4 or the response signal 24 that is infrared rays.

The data display button 37 sets to display real-time information at the headphone 22 side on the liquid crystal display panel 27 of the remote control unit 23 not so as to influence on mode in play at the headphone 22 side. For instance, during music play or the like, when, after the data display button 37 is pushed down, the stop button 32 is pushed down, the battery remains is displayed on the liquid crystal display panel 27. When, after the data display button 37 is pushed down, the fast forward button 34 is pushed down, the memory remains of the memory card 6 is displayed on the liquid crystal display panel 27. Other than these, as the real-time information to be displayed, file No showing in what order the music in play is, music name in play, repeat showing repetition of the same music, play period after the start of play, hold for nullifying input from a malfunction preventive button, or media mount display showing that the memory card 6 is mounted can be cited. In addition, when simply the play button 31, stop button 32, reverse button 33, or fast forward button 34 is pushed down, PLAY (reproduction), STOP (stoppage), REV (rewinding), or FF (fast forward) is displayed on the liquid crystal display panel 27, respectively.

Figure 11:
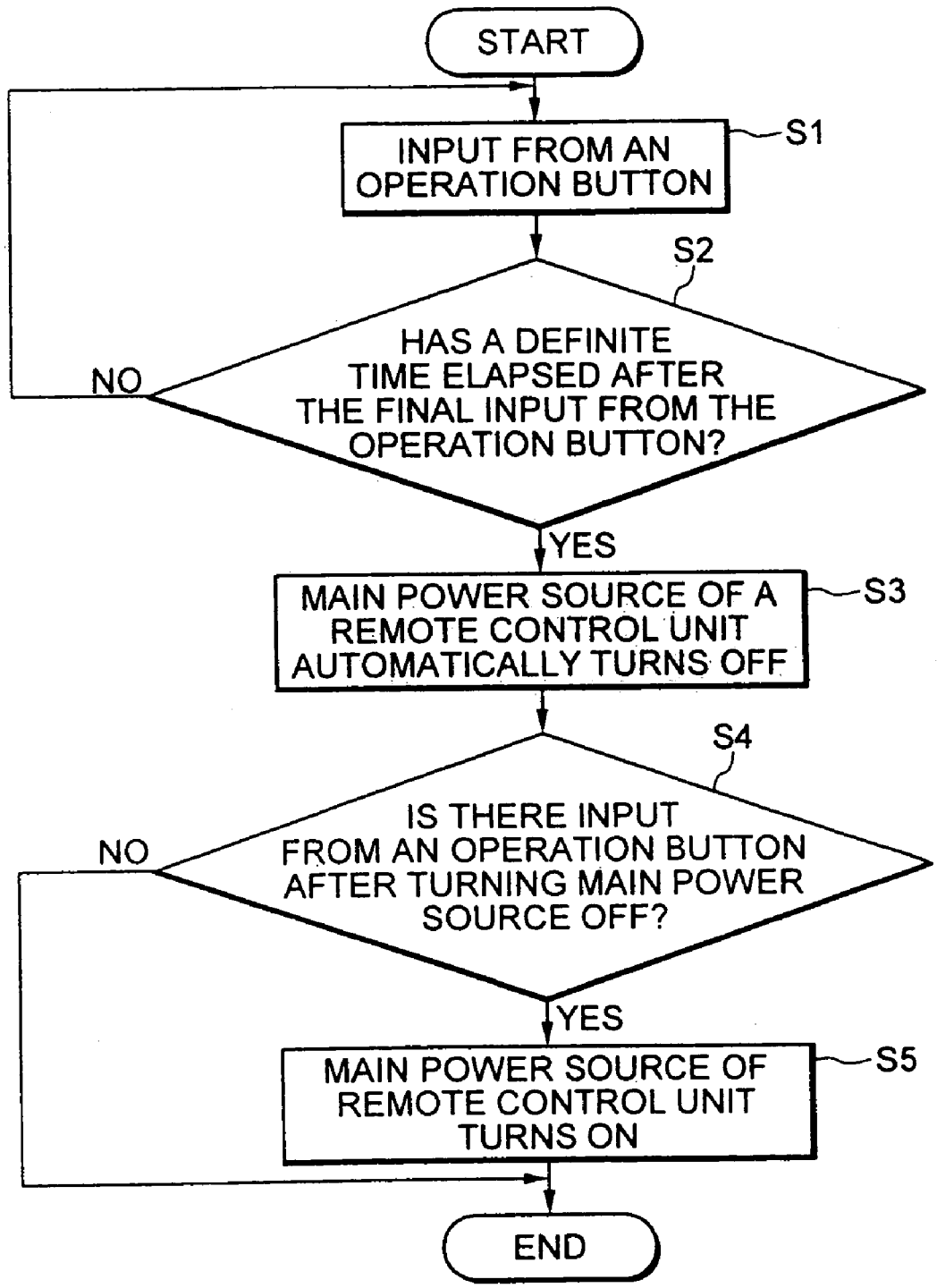
FIG. 11 is a flowchart for explaining a power saving function that the remote control unit of FIG. 9 possesses.

Further, in the remote control unit 23 of the present embodiment, all operation buttons play a role of power switch for turning ON a main power source. In addition, a power saving function for tuning automatically OFF the main power source when a definite period of time has elapsed after turning on any one of operation buttons is disposed. That is, as shown in FIG. 11, in the remote control unit 23, when, after key-entry from any one of operation buttons (S1), a definite period of time has elapsed without any key-entry from the operation button (S2), the main power source of the remote control unit 23 automatically turns OFF (S3). Further, after turning the power source OFF, when key-entered again from any one of operation buttons (S4), the main power source of the remote control unit 23 turns ON (S5).

Thus, according to the audio system of the present embodiment, when a certain operation button of the remote control unit 23 is pushed down and the control signal 4 responding the control involving the play of the pushed down button is transmitted, the information based on the response signal 24 from the headphone 22 can be visually displayed on the liquid crystal display panel 27 disposed to the remote control unit 23. Accordingly, a user 38 who operates the remote control unit 23 can grasp the control mode involving the play of the music information at the headphone 22 side such as for instance play, reverse, fast forward or stop. Accordingly, whether an intended control is assuredly implemented at the headphone 22 side or not can be confirmed. In addition, the memory remains of the memory card 6 therein the music information is stored, or the battery remains of the headphone 22 side can be obtained at the remote control unit 23 side.

Further, in the audio system of the present embodiment, the infrared transmitter/receiver 36 is disposed on a surface of the remote control unit 23, that is on the same face with that where the liquid crystal display panel 27 or the PLAY button 31, STOP button 32 and the like are disposed. Thereby, when a user 38 wears the headphone 22 on her/his head and carries out an remote control operation through an operation button while observing the liquid crystal display panel 27 of the remote control unit 23, the infrared transmitter/receiver 36 is necessarily directed to the headphone 22 side. Accordingly, according to the audio system of the present embodiment, a user 38, without noticing a direction of the remote control unit 23, can assuredly carry out transmission/reception of the control signal 4 or the response signal 24 responding to the control signal 4.

Further, according to the audio system of the present embodiment, according to the state of input from the operation button, ON/OFF control of the main power source of the remote control unit 23 is carried out. That is, when the operation button is not pushed down for more than a definite period of time, the main power source of the remote control unit 23 is controlled to be OFF. Further, when, after the main power source is turned OFF, the operation button is pushed down, the main power source of the remote control unit 23 is controlled to be ON. Accordingly, without damaging the convenience as the system, the saving of consumption power, an important item for a portable electric appliance, can be realized.

Figure 12:
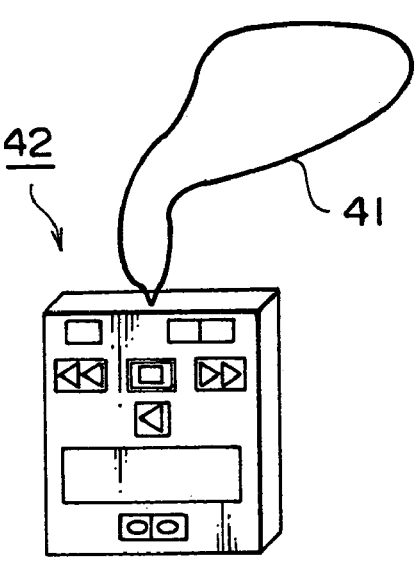
FIG. 12 is a perspective view showing a pendant type remote control unit into which a shape of the remote control unit of FIG. 9 is modified.
Figure 13:
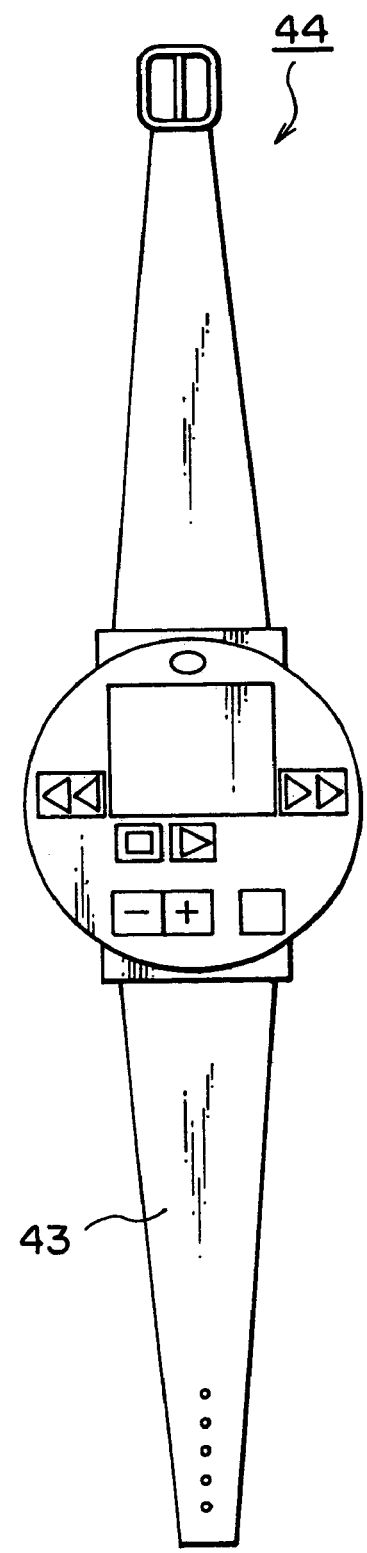
FIG. 13 is a plan view showing a wristwatch type remote control unit into which a shape of the remote control unit of FIG. 9 is modified.

The remote control units 3 and 23 of the present embodiments are operated in user's hand. However, as shown in FIG. 12 for instance, by downsizing the remote control units 3 and 23 as much as possible and attaching a chain 41 or the like, a pendant type remote control unit 42 can be constituted. Further, as shown in FIG. 13, by attaching a belt 43, a wristwatch type remote control unit 44 can be constituted. Other than these, the remote control unit can be constituted in for instance a brooch type or a key-ring type. Further, in order to further improve the convenience as the portable instrument, to the aforementioned remote control units of the present embodiments, watch function, game function, telephone function or pager function can be added to constitute an audio system.

Further, the remote control units 3 and 23 of the present embodiments may be provided with a mechanism for attaching and detaching the remote control unit 3 or 23 to and from a watchband. Here, as the mechanism for attaching and detaching the remote control unit 3 or 23 to and from the watchband, for instance, a clip or a rubber band can be attached to the remote control unit 3 or 23.

Thus, by disposing a mechanism for attaching and detaching the remote control unit 3 or 23 to and from the watchband, the remote control unit 3 or 23 can be brought with one's arm. Thereby, the convenience during bringing the remote control unit 3 or 23 can be improved.

Further, the headphone 2 or 22 of the present embodiments may comprise a mechanism for attaching and detaching the remote control unit 3 or 23. Here, as the mechanism for attaching and detaching the remote control unit 3 or 23, for instance, a receiver capable of receiving the remote control unit 3 or 23 can be disposed to the headphone 2 or 22.

Thus, due to disposition of the mechanism of attaching and detaching the remote control unit 3 or 23 to and from the headphone 2 or 22, the remote control unit 3 or 23 is prevented from being lost to be incapable of controlling the headphone 2 or 22.

Further, the remote control unit 3 or 23 of the present embodiments may be a ring type remote control unit.

Figure 14:
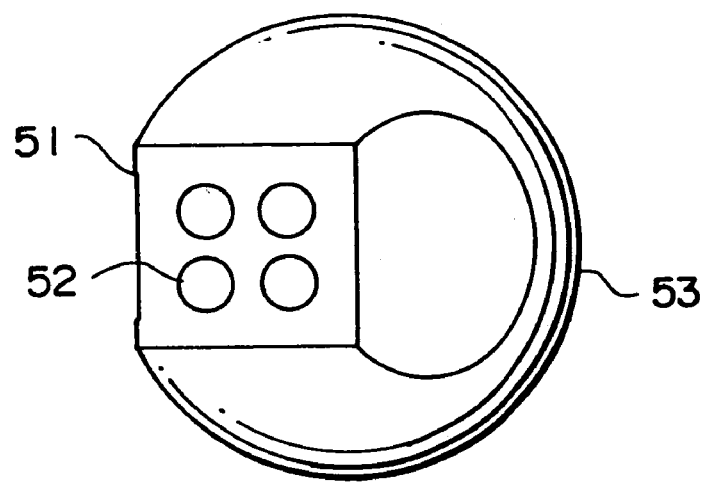
FIG. 14 is a perspective view of a ring type remote control unit involving a fourth embodiment of the present invention.

FIG. 14 is a perspective view showing a ring type remote control unit involving a fourth embodiment of the present invention. In FIG. 14, a remote control unit 51 is provided with an operation button 52 and a ring 53 capable of fitting to a finger. By wearing the remote control unit 51 thereto the ring 53 is disposed and by operating the operation button 52, the headphone 2 or 22 can be operated. Further, by adorning the remote control unit 51 or the ring 53, fashionability can be given.

Further, the remote control units 3 and 23 of the present embodiments may be attached with an adhesive tape. Here, in order to stick the remote control unit, an adhesive or a magic tape can be used.

Further, in the aforementioned embodiments, in order to obtain directionality during transmitting/receiving the control signal 4 and the response signal 24, infrared rays are used. However, the control signal 4 and the response signal 24 can be transmitted/received through electromagnetic waves. In this case, in order to obtain directionality during transmitting/receiving the control signal 4 and the response signal 24, an antenna is preferably disposed in a shield unit having an opening at a prescribed position.

Figure 15:
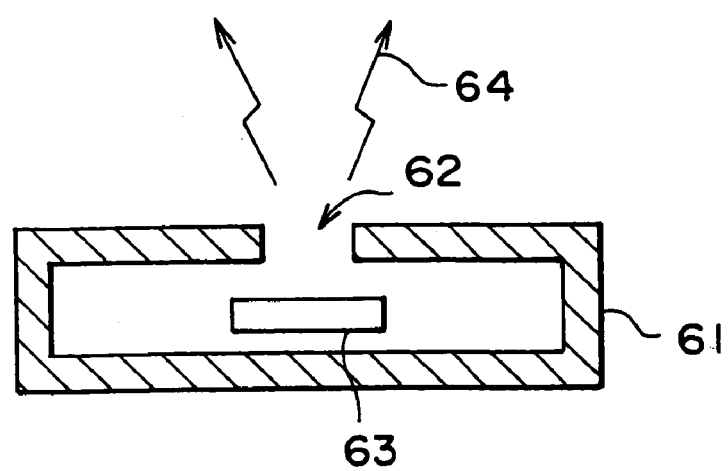
FIG. 15 is a cross section showing a constitution of an antenna portion of a remote control unit involving a fifth embodiment of the present invention.

FIG. 15 is a cross section showing a constitution of an antenna portion of the remote control unit involving a fifth embodiment of the present invention. In FIG. 15, the shield unit 61 is provided with an opening 62, therein an antenna 63 being disposed. Electromagnetic waves 64 generated by the antenna 63 are sent out of the opening 62 outside the shield unit 61, electromagnetic waves in other direction than this being shielded by the shield unit 61. Accordingly, the electromagnetic waves 64 generated by the antenna 63 can be given directionality. Accordingly, even when the control signal 4 and the response signal 24 are transmitted/received over the electromagnetic waved 64, the control signal 4 and the response signal 24 can be prevented from being radio interfered.

Further, audio signal is sent out of the memory card 6 that is mounted on the headphone 2 or 22. Accordingly, even when the electromagnetic waves are sent out with directionality, only during operating the headphone 2 or 22, the remote control unit needs to be directed to the headphone 2 or 22. During music, the remote control unit is unnecessary to be incessantly directed to the headphone 2 or 22. Accordingly, user's inconvenience during music with the headphone 2 or 22 can be alleviated.

Further, in the aforementioned embodiments, in order to operate the headphone 2 or 22, the remote control unit 3 or 23 dedicated to an operation of the headphone 2 or 22 is used. However, the headphone 2 or 22 may be operated from a portable information terminal. Here, as the portable information terminal, a portable telephone and a PHS can be employed.

Figure 16:
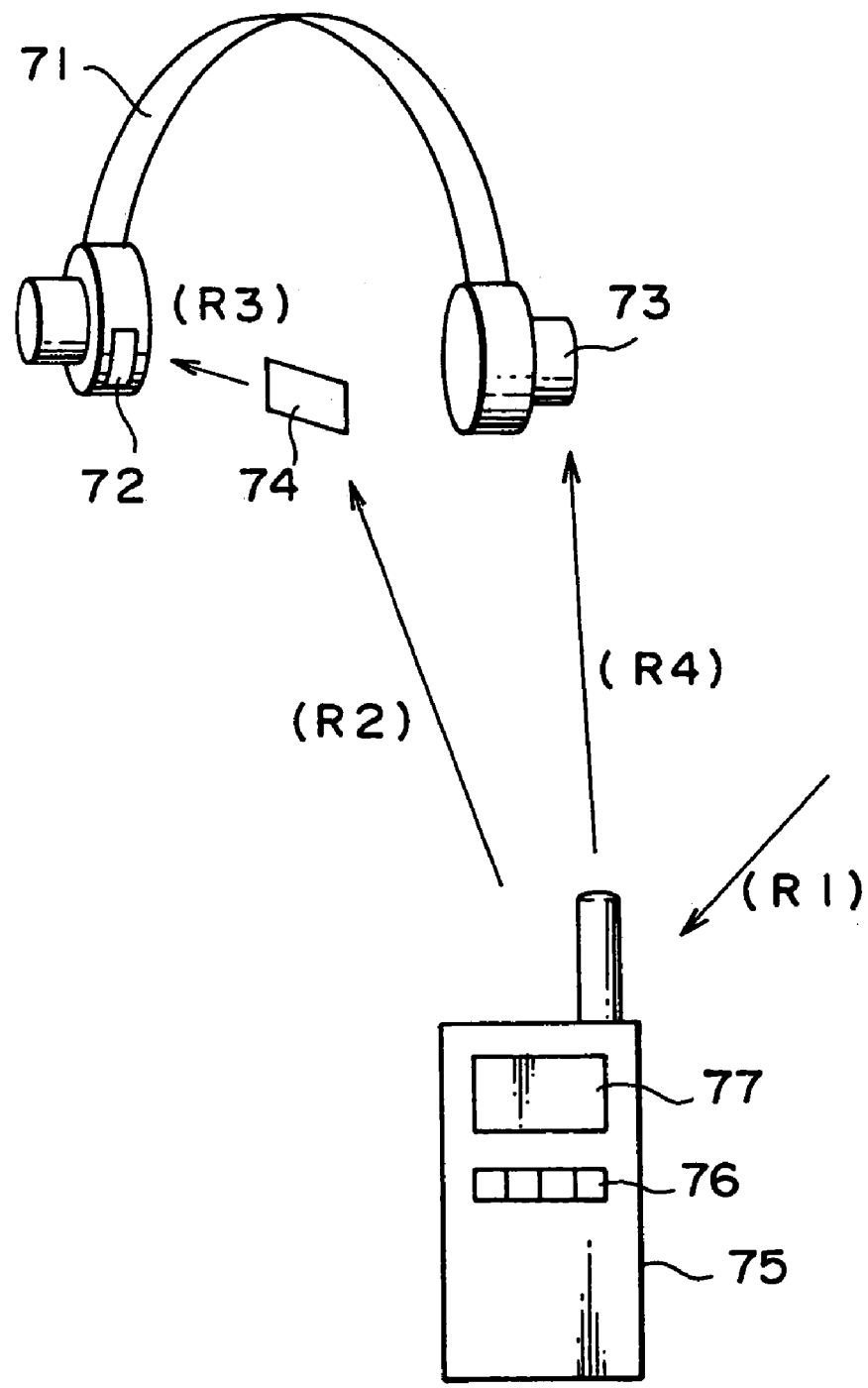
FIG. 16 is a diagram schematically showing an audio system involving a sixth embodiment of the present invention.

FIG. 16 is a diagram schematically showing an audio system involving a sixth embodiment of the present invention. In FIG. 16, a portable telephone 75 is provided with an operation portion 76 for operating a headphone 71. Here, when there is a piece of music that a user wants to hear, the music is selected by the portable telephone 75, transmission demand of the music being sent to the distributor of the music. Then, the distributor transmits the sound information demanded to transmit to the portable telephone 75. The portable telephone 75, upon receiving (R1) the sound information transmitted from the distributor, downloads (R2) the received sound information to a memory card 74 mounted on a memory card socket portion that is not shown in the figure.

Next, upon downloading the sound information to the memory card 74, the memory card 74 is taken out of the memory card socket portion of the portable telephone 75, being inserted (R3) in an external interface 72 disposed to the headphone 71.

Then, the user, when operating the headphone 71, operates an operation portion 76 of the portable telephone 75. Thereby, the control signal is transmitted from the portable telephone 75, the control signal being received (R4) by a receiver 73 disposed to the headphone 71. Thereby, the headphone 71, according to the control signal transmitted from the portable telephone 75, can play, fast forward, reverse or stop the sound information stored in the memory card 74.

Further, the headphone 71 may transmit the response signal showing a state of operation of the headphone 71 to the portable telephone 75. In this case, the portable telephone 75, upon receiving the response signal from the headphone 71, displays a state of operation of the headphone 71 shown by the response signal on a display portion 77 disposed to the portable telephone 75.

While the present invention has been particularly shown and described with reference to preferred embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

What is claimed is:

1. An audio system, comprising:
   a head attachment audio unit having a reproduction portion configured to reproduce audio information stored in a memory portion and an output portion configured to output sound according to the reproduced audio information; and
   a remote control unit having a plurality of operation buttons, each operation button configured to implement a corresponding one of a plurality of operation modes for audio reproduction, the plurality of operation modes comprising a start reproducing audio information mode, a stop reproducing audio information mode, a reversing mode and a fast forwarding mode, the remote control unit configured to transmit a control signal that controls the plurality of operation modes for audio reproduction of the reproduction portion, the remote control unit transmitting the control signal to the head attachment audio unit via a wireless connection, wherein the remote control unit comprises a transmitter configured to transmit the control signal, the transmitter comprising an antenna configured to transmit electromagnetic waves; and a shield unit in which the antenna is disposed, the shield unit having an opening at a prescribed position thereof and which is configured to allow the electromagnetic waves to be transmitted out therefrom, wherein the head attachment audio unit further comprises a response portion configured to return response signal corresponding to the control signal to the remote control unit, and the remote control unit further comprises a reception portion configured to receive the response signal.

2. The audio system as set forth in claim 1, wherein the remote control unit is attached with at least any one of a wrist-belt, an adhesive tape and a chain.

3. The audio system as set forth in claim 1, wherein the remote control unit comprises a mechanism of attaching and detaching the remote control unit to and from a watchband.

4. The audio system as set forth in claim 1, wherein the remote control unit is in shape of a ring.

5. The audio system as set forth in claim 1, wherein the memory portion is a memory medium freely attachable and detachable to and from the head attachment audio unit body.

6. The audio system as set forth in claim 1, wherein the memory portion is a solid memory disposed to the head attachment audio unit body.

7. The audio system as set forth in claim 1, wherein the head attachment audio unit further comprises an input terminal configured to input audio signal.

8. The audio system as set forth in claim 1, wherein the remote control unit further comprises a display portion configured to display information visually based on the response signal received by the reception portion.

9. The audio system as set forth in claim 1 wherein the remote control unit further comprises:

a transmitter/receiver configured to transmit, when one of the plurality of operation buttons is pushed down, the control signal corresponding to the pushed operation button, and configured to receive the response signal corresponding to the control signal; and a display portion configured to display information visually based on the response signal received by the transmitter/receiver.

10. The audio system as set forth in claim 9, wherein the transmitter/receiver of the remote control unit is disposed on a same face as on which the display portion or the operation button is disposed.

11. The audio system as set forth in claim 9, wherein the remote control unit further comprises an ON/OFF operation portion configured to control ON/OFF of a main power source of the remote control unit body according to an input situation from the operation button.

12. An audio system, comprising:

a head attachment audio unit having a reproduction portion configured to reproduce audio information stored in a memory portion and an output portion configured to output sound according to the reproduced audio information; and a remote control unit having a plurality of operation buttons, each operation button configured to implement a corresponding one of a plurality of operation modes for audio reproduction, the plurality of operation modes comprising a start reproducing audio information mode, a stop reproducing audio information mode, a reversing mode and a fast forwarding mode, the remote control unit configured to transmit a control signal that controls the plurality of operation modes for audio reproduction of the reproduction portion, the remote control unit transmitting the control signal to the head attachment audio unit via a wireless connection, wherein the remote control unit is one body with a portable information terminal and the audio information is downloaded through the portable information terminal to the memory portion.

13. An audio system, comprising:

a head attachment audio unit having a reproduction portion configured to reproduce audio information stored in a memory portion and an output portion configured to output sound according to the reproduced audio information; and a remote control unit having a plurality of operation buttons, each operation button configured to implement a corresponding one of a plurality of operation modes for audio reproduction, the plurality of operation modes comprising a start reproducing audio information mode, a stop reproducing audio information mode, a reversing mode and a fast forwarding mode, the remote control unit configured to transmit a control signal that controls the plurality of operation modes for audio reproduction of the reproduction portion, the remote control unit transmitting the control signal to the head attachment audio unit via a wireless connection, wherein the head attachment audio unit further comprises a mechanism capable of attaching and detaching the remote control unit.

14. The audio system as set forth in claim 13, wherein the remote control unit configured to transmit the control signal to the head attachment audio unit via a wireless connection is configured to transmit the control signal via infrared or electromagnetic waves.

15. The audio system as set forth in claim 13, wherein the memory portion is a memory medium freely attachable and detachable to and from the head attachment audio unit body.

16. The audio system as set forth in claim 13, wherein the memory portion is a solid memory disposed to the head attachment audio unit body.

17. The audio system as set forth in claim 13, wherein the head attachment audio unit further comprises an input terminal configured to input audio signal.

18. The audio system as set forth in claim 13,
wherein the head attachment audio unit further comprises a response portion configured to return response signal corresponding to the control signal to the remote control unit; and
the remote control unit further comprises a reception portion configured to receive the response signal.

19. The audio system as set forth in claim 18,
wherein the remote control unit further comprises a display portion configured to display information visually based on the response signal received by the reception portion.

20. The audio system as set forth in claim 18 wherein the remote control unit further comprises:
a transmitter/receiver configured to transmit, when one of the plurality of operation buttons is pushed down, the control signal corresponding to the pushed operation button, and configured to receive the response signal corresponding to the control signal; and
a display portion configured to display information visually based on the response signal received by the transmitter/receiver.

21. The audio system as set forth in claim 20,
wherein the transmitter/receiver of the remote control unit is disposed on a same face as on which the display portion or the operation button is disposed.

22. The audio system as set forth in claim 20,
wherein the remote control unit further comprises an ON/OFF operation portion configured to control ON/OFF of a main power source of the remote control unit body according to an input situation from the operation button.

* * * * *